INVENTOR:
RICHARD G. HARPER,
BY McGrew & Edwards
ATTORNEYS.

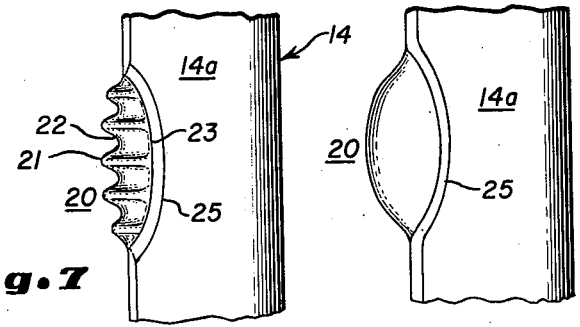
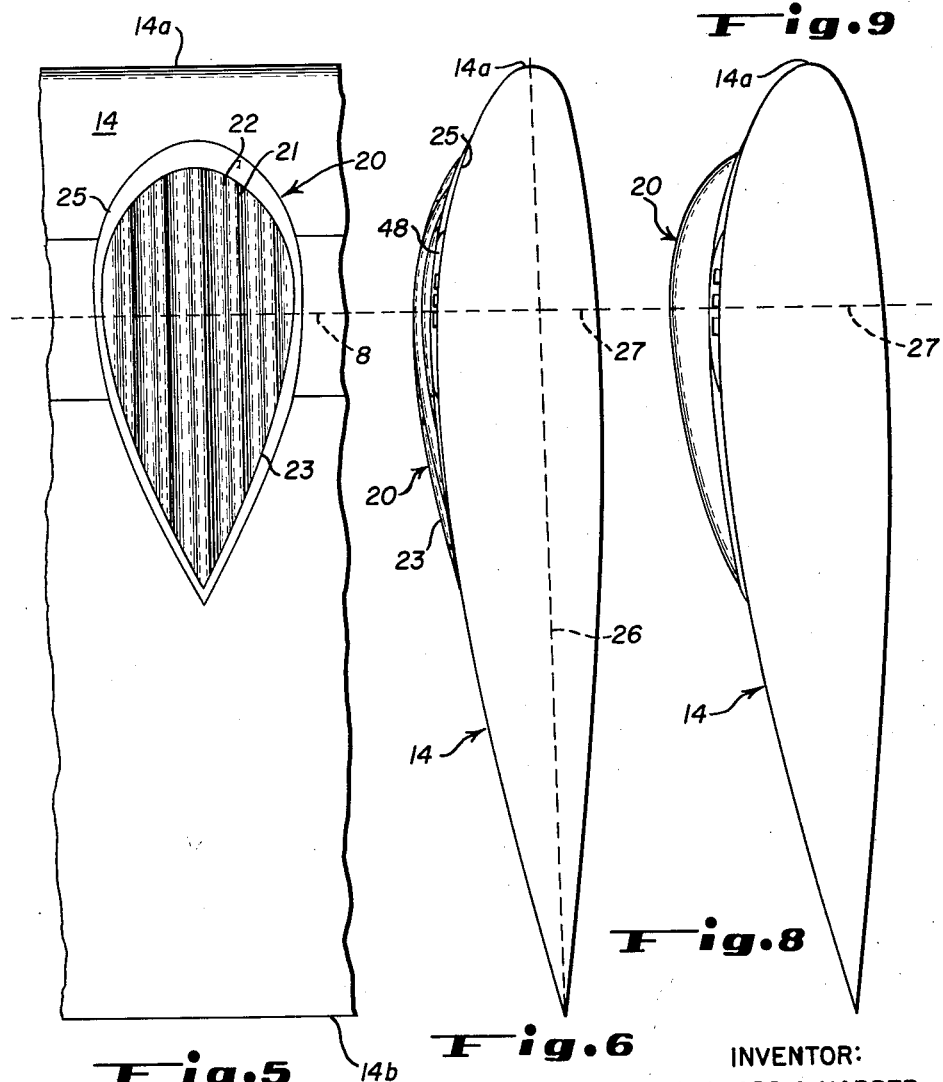

INVENTOR:
RICHARD G. HARPER,
ATTORNEYS.

April 21, 1964 R. G. HARPER 3,129,908
DEVICE FOR SELECTIVELY ALTERING LIFT
CHARACTERISTICS OF AN AIRFOIL
Filed Aug. 25, 1961 4 Sheets-Sheet 4
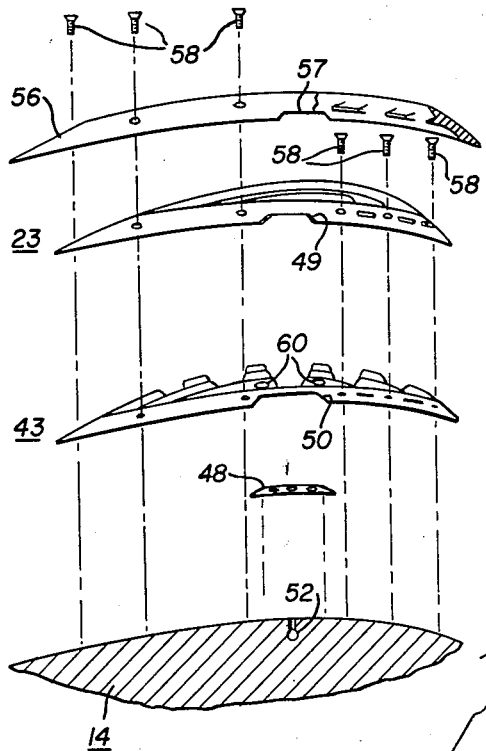
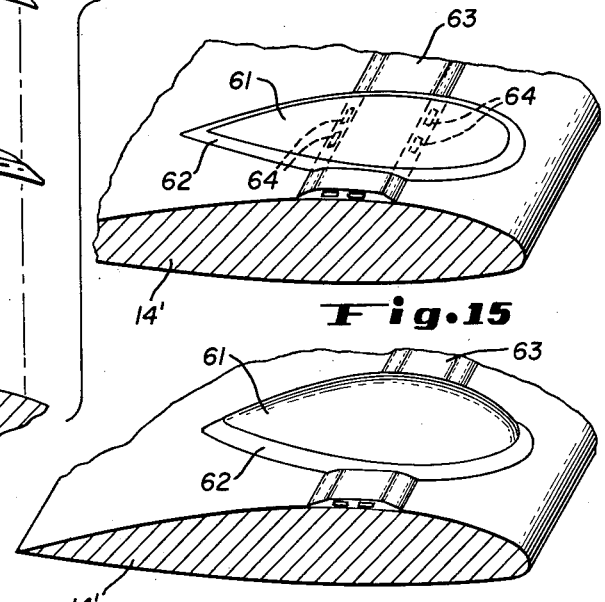
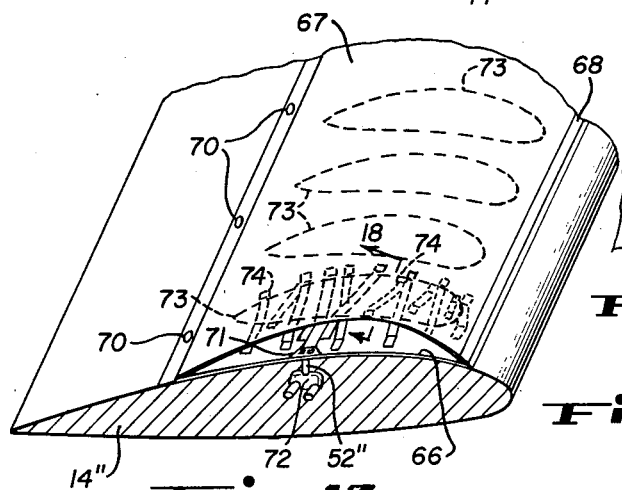
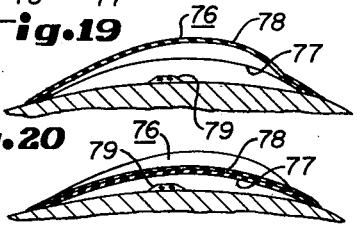
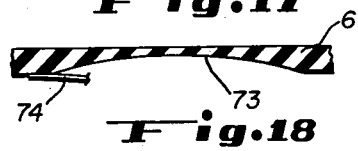
INVENTOR:
RICHARD G. HARPER,
BY *McGrew & Edwards*
ATTORNEYS.

United States Patent Office 3,129,908
Patented Apr. 21, 1964

3,129,908
DEVICE FOR SELECTIVELY ALTERING LIFT
CHARACTERISTICS OF AN AIRFOIL
Richard G. Harper, 339 E. 10th Ave., Apt. 609,
Denver 3, Colo.
Filed Aug. 25, 1961, Ser. No. 133,948
9 Claims. (Cl. 244—44)

This invention relates to aircraft and particularly to an improved device for selectively altering the lift characteristics of an airfoil for increasing the camber of an airfoil lifting surface to secure low aircraft take-off and landing speeds at high angles of attack.

Heretofore there have been proposed various extensible or inflatable devices for varying the aerodynamic characteristics of the leading edge of an airfoil for such purposes as de-icing, overcoming excessive shock wave effects on the control surfaces of high-speed aircraft, controlling boundary layer at high Mach number speeds, and approximating ideal aerodynamic flow characteristics. My invention is distinct from, and is not to be confused with, such practices.

It is an object of my invention to provide an airfoil assembly including an improved arrangement for securing increased lift at low landing speeds.

It is another object of this invention to provide an improved device for selectively altering the lift characteristics of an airfoil.

It is a further object of this invention to provide an airfoil control device including an improved arrangement for securing increased lift capacity at high angles of attack.

It is a further object of this invention to provide an inflatable device for effecting increased camber of an airfoil and which in its deflated condition presents relatively small drag and further provides boundary layer fences tending to decrease slip on turns.

Briefly, in carrying out the objects of this invention there is provided an apparatus for effecting local or limited distortion or alteration of an airfoil over a major portion of its lifting surface. This alteration provides a change in the camber of the airfoil whereby an increase in its lift capacity is produced at high angles of attack. The term "camber" as used herein may be defined as the convexity of an airfoil from its chord and may be expressed as the ratio of the maximum departure or height of the curved surface of the airfoil to the length of the chord.

In one embodiment of this invention a plurality of inflatable bladders are arranged at spaced intervals along a major portion of the length of the lifting surface of an aircraft wing. The bladders preferably are located in the upper lifting surface in the area of greatest height of the airfoil from its chord. The bladders are arranged to be selectively inflated so that they may be employed, for example, during landing of the aircraft to provide increased camber of the airfoil. This permits higher angles of attack for landing.

In another embodiment the inflatable portion of the airfoil is extended continuously along the area of the wing where it is located and is made with relatively thin areas defining the pods or bladders; in addition tension members may be secured between the wing surface and the material of the expansible member to more positively limit the expansion of the airfoil except in the pod areas. In another embodiment the expansible member is laminated and the inflated configuration is controlled by variations in the elasticity of the expansible member.

The features of novelty which characterize the invention are pointed out with particularity in the claims appended to and forming a part of this specification. The invention itself, however, both as to its organization and method of operation may best be understood by reference to the following description taken in connection with the accompanying drawings, in which:

FIG. 5 is an enlarged plan view of a portion of the wing of the aircraft of FIG. 1 showing one of the expansible elements;

FIG. 6 is a sectional elevation view of the element of FIG. 5, sectional details of the wing being omitted;

FIG. 7 is a front view of the section of the airfoil shown in FIG. 5;

FIG. 8 is a sectional view like FIG. 6 showing the expansible element inflated;

FIG. 9 is a front view of the section shown in FIG. 8 showing the inflated condition of the device;

FIG. 14 is an exploded view partly in section of an airfoil provided with the elements of FIGS. 10 through 13;

FIG. 15 is a fragmentary isometric view partially in section illustrating an alternative expansible device embodying my invention in its deflated condition;

FIG. 16 is the device of FIG. 15 in its expanded condition;

FIG. 17 is a fragmentary isometric view partially in section of another embodiment of my invention;

FIG. 18 is an enlarged sectional view taken along the line 18—18 of FIG. 17;

FIG. 19 is a plan view of a portion of an aircraft wing illustrating a further embodiment of my invention;

FIG. 20 is a sectional view taken along the line 20—20 of FIG. 19; and

FIG. 21 is a sectional view taken along the line 21—21 of FIG. 19.

Figure 1:
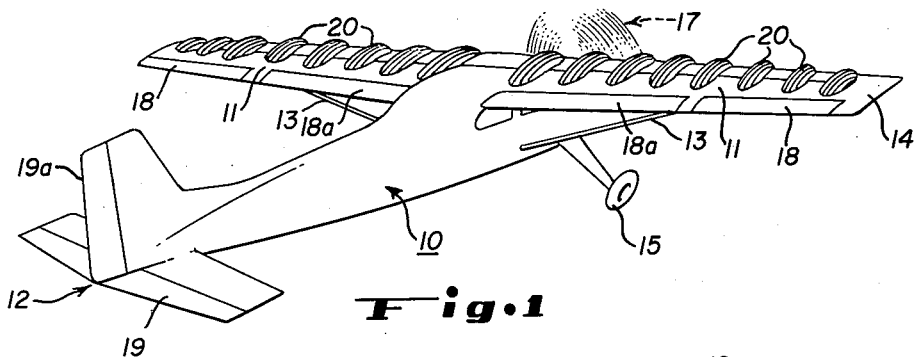
FIG. 1 is an isometric view of an aircraft provided with expansible airfoil modifying elements embodying this invention and which are shown in their collapsed positions.

Referring now to the drawings, the invention has been illustrated as applied to an airplane of the conventional propeller driven, high wing type. With reference to FIGS. 1 to 4, inclusive, the aircraft illustrated comprises a fuselage 10 having wings 11 and a tail assembly or empennage 12. The wings 11 are supported on the upper side of the fuselage 10 and are provided with further support by struts 13. Landing wheels are provided as indicated at 15 and the aircraft is propelled by a conventional internal combustion engine indicated at 16 in FIGS. 2 and 4 which drives a propeller 17. The aircraft is provided with the conventional control surfaces including ailerons 18, elevators 19 and a rudder 19a. Landing flaps are also provided as indicated at 18a.

Figure 2:
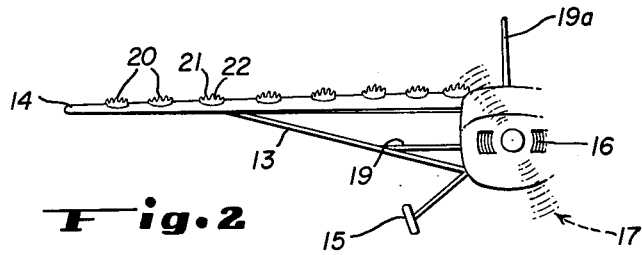
FIG. 2 is a fragmentary detail view from the front of the aircraft of FIG. 1.

The airplane as illustrated may be flown in the conventional manner at the normal take-off and landing speeds. However, in order to facilitate the landing and take-off at lower speeds and hence from shorter airstrips, airfoil control devices 20 embodying the present invention have been illustrated as located at spaced intervals along the upper side of the wings 14. The devices 20, which extend along the major portions of both wings 11, are shown in FIGS. 1 and 2 in their deflated or unextended positions and in FIGS. 3 and 4 in their inflated or extended positions. They are thus arranged to modify the upper airfoil or wing surface of the aircraft by changing the effective curvature or camber of the airfoil at the location of each of the devices.

Each of the devices 20 comprises a diaphragm or bladder of flexible but relatively inelastic material which in its deflated condition conforms to a fluted or corrugated base giving it the corrugated appearance shown in FIGS. 1 and 2. The devices 20 are of decreasing size from the center to the tip of the wings. Thus they decrease in size toward the tip in proportion to the decrease in width of the wing and follow generally the aerodynamic design of the wing.

The assemblies 20 are inflated and deflated under control of the pilot within the fuselage by operation of a pneumatic control system (not shown) so that the pilot can operate the devices selectively at will when he desires to change the lift characteristics of the main wing airfoil. The details of the system for supplying air or gas to the extensible control elements 20 have not been illustrated, as they are not essential to an understanding of the invention.

When the devices 20 are in their deflated positions as shown in FIGS. 1 and 2, the fluted configuration of the devices helps to minimize slip during turns since it provides a longitudinal series of ridges transverse to the direction of sideward movement through the air. They thus constitute boundary layer fences. In their deflated condition the collapsible bladders produce their minimum drag. When the pilot desires to fly the aircraft at a high angle of attack such as during landing, take-off or in slow flight, the devices 20 are inflated and effect an increase in the camber of the wings. Because the devices 20 are arranged at spaced intervals along the aircraft wing, they also act as boundary layer fences to resist slip on turns.

The details of construction of the airfoil modifying assemblies 20 are illustrated in FIGS. 5 to 16, inclusive, which clearly indicate the generally teardrop configuration of the assemblies and the manner in which the expansible diaphragms or bladders are mounted and controlled.

FIGS. 5 through 9 are enlarged views indicating more clearly the disposition of the assemblies 20 on the wing section and particularly illustrate the arrangement and location of one of the assemblies. FIGS. 5, 6 and 7 illustrate the deflated condition of the device 20 and show the alternate ridges and depressions 21 and 22, respectively, covered by the flexible diaphragm or bladder 23 which is secured in position by a clamping ring 25. As shown in FIGS. 5 and 6 the assemblies 20 are arranged over the forward portion of the wing and lie in the area of maximum curvature where there is the greatest departure of the curve from the chord of the wing, the chord being a straight line drawn generally from the leading edge of the wing to the trailing edge as indicated by a dot-and-dash line 26 in FIG. 6. The apex of the curve of the wing where there is maximum departure from the chord is indicated generally by the dotted line 27 in FIGS. 5, 6 and 8.

The devices 20 when inflated as shown in FIGS. 8 and 9 provide a generally dome shaped appearance and in the plan view, as shown in FIG. 6, are of teardrop configuration, the teardrop extending from a position near the leading edge of the wing and extending back over the apex of the wing to a point somewhat beyond the center line of the wing. Thus the major area of the device lies directly above the forward portion of the wing and extends over a substantial portion of the forwardly facing curve of the wing. The ridges 21 and depressions 22 are of substantially uniform depth, their length conforming to the teardrop configuration of the device.

Figure 3:
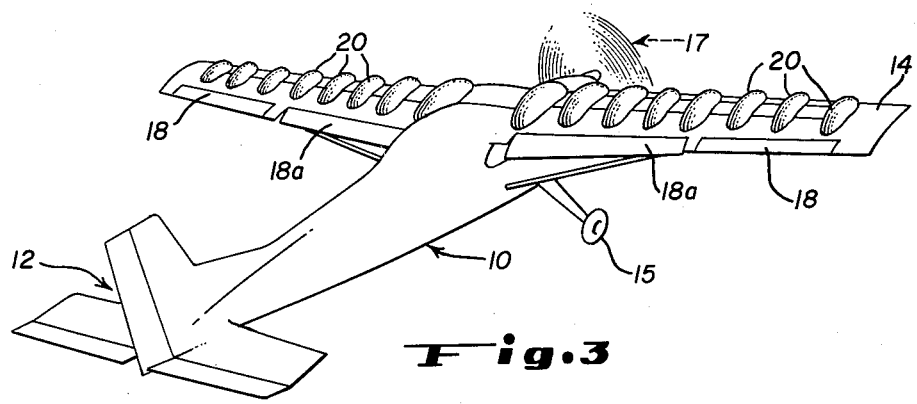
FIG. 3 is the aircraft of FIG. 1 with the expansible elements inflated.
Figure 4:
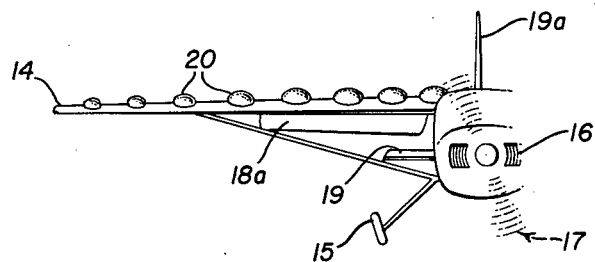
FIG. 4 is a fragmentary view from the front of the aircraft of FIG. 3.

When the device is inflated as indicated in FIGS. 8 and 9 it presents a smoothly rounded dome or tear shaped configuration and substantially increases the camber of the airfoil in the area of the device and effectively increases the lift at high angles of attack, the angle of attack being understood as the acute angle between the chord of the wing and the line of flight. Thus when the aircraft is being brought in for landing with the flaps 18a lowered as indicated in FIGS. 3 and 4, the devices 20 are inflated as also shown in these figures and provide increased lift and facilitate the landing of the aircraft at lower speeds.

Figure 10:
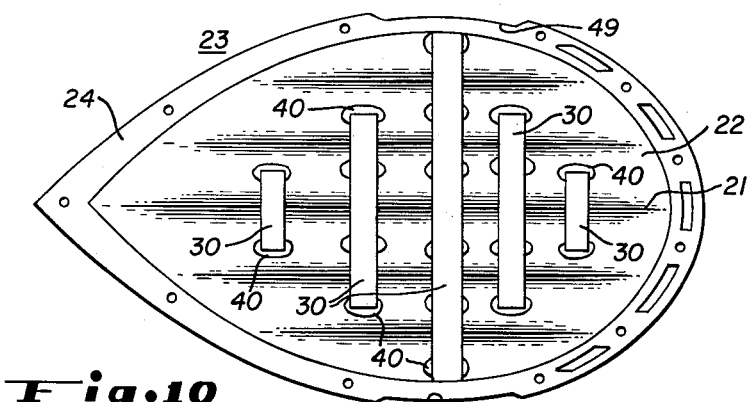
FIG. 10 is a bottom view of the diaphragm assembly of one of the expansible elements.
Figure 11:
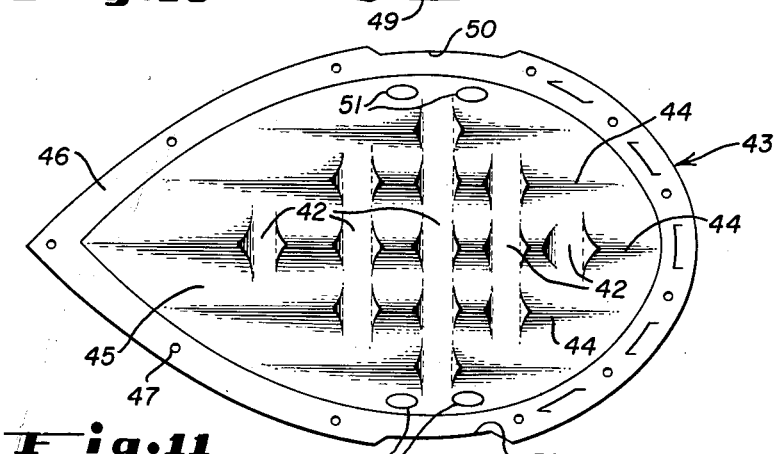
FIG. 11 is a top view of a base plate usable with the element of FIG. 10.
Figure 12:
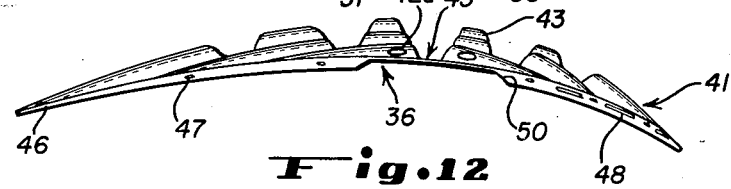
FIG. 12 is a side elevation of the base plate of FIG. 11.
Figure 13:
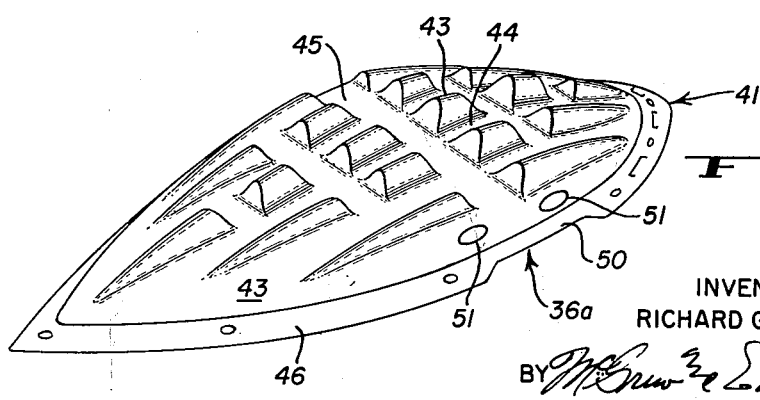
FIG. 13 is a perspective view of the base plate of FIGS. 11 and 12.

The construction of the expansible diaphragm 23 and of the base plate which determines the configuration of the alternate ridges and depressions 21 and 22 is shown in FIGS. 10 to 13, inclusive. As shown in FIG. 10, which is a bottom view of the diaphragm 23, the diaphragm has been removed from its position over its base plate; however, the configuration of the ridges 21 and depressions 22 remains intact. The diaphragm 23 is provided with a plurality of elastic tension bands 30 extending laterally across the diaphragm and secured to the diaphragm by cementing, vulcanizing or other suitable process at areas 40 generally lying along the center lines of the depressions 22. The bands 30 are of different lengths depending upon their positions along the diaphragm and are located so that they are in alignment with transverse cuts 42 formed in a template or molding base 43, plan, elevation and perspective views of which are shown in FIGS. 11, 12, and 13, respectively. The diaphragm is stamped, molded or otherwise constructed to provide an attaching border portion or rim 24 to facilitate the securing and sealing of the diaphragm to the base of the device.

The base plate 43 is provided with smoothly curved ridges 44 corresponding to the ridges 21 to be formed in the diaphragm and which are interrupted by the transverse cuts 42; these ridges provide intermediate smoothly curved zones or valleys 45 which form the depressions 22 in the diaphragm.

The diaphragm 23 is constructed of relatively inelastic material to provide when inflated the teardrop configuration indicated in FIGS. 8 and 9. When the gas pressure is released and the diaphragms are deflated the elastic bands or tension members 30 draw the diaphragm downwardly as they move into the transverse cuts 42 and move the diaphragm into its position conforming to the ridges and valleys determined by the configuration of the base plate 43. For some applications it may be desirable to provide a vacuum system which may be employed to draw the diaphragm closely against the mold plate 43 to minimize movement or vibration of the diaphragm during normal flight.

It will thus be apparent that the configuration of the mold plate 43 makes it possible to provide a non-elastic diaphragm which will have a smooth, inflated outer surface of teardrop form and will, when deflated, conform to a configuration presenting the ridges and valleys such as indiacted at 20 and 21 while maintaining a smooth surface to minimize drag. Thus there is effective control of the configuration and dimensions of the expansible elements in both their expanded and contracted positions. This configuration and the appearance of the base plate 43 are shown clearly in the perspective view FIG. 13.

The several devices 20 are connected with a common gas or air supply and exhaust conduit indicated at 48 in FIGS. 6 and 8, the diaphragm 23 and mold plate 43 having recesses 49 and 50, respectively, which fit over the conduit 43 so that air may be admitted from the conduit to the space between the diaphragm and the mold plate through suitable openings provided for the purpose in the mold plate as indicated at 51.

The manner in which the assemblies 20 are assembled over the airfoil surface is clearly indicated in FIG. 14 which is an exploded view with the parts positioned in order above the airfoil surface of the wing 11. At the inboard end or base of the wing there is provided a supply and exhaust fitting 52 which is connected in communication with the passage in the air duct strip or conduit 48. This duct strip is cemented or otherwise securely bonded to the airfoil surface and the several components of the assembly are then mounted in position in order, first the base plate 43, then the diaphragm 23, and finally a shield ring 56. The ring 56 is provided with recesses 57 corresponding to the recesses 49 and 50 in the diaphragm and base plate and which fit over the air conduit 48. The several elements are held securely in position over the wing 58. The air duct strip 48 is provided with openings (not shown in FIG. 14) communicating with the under portion of the base plate 43 and in turn with a space between the base plate and the diaphragm 23 through openings 60 in the base plate.

The supply and control of air or gas for admission to the interior of the diaphragms may be effected in any suitable manner. The air supply conduit 48 may be connected through the fitting 52 with any suitable valve apparatus (not shown) located inboard on the aircraft for selectively providing pressure or vacuum for operation of the diaphragm devices. Thus, an air scoop may be provided for supplying air under pressure and a Venturi for lowering the pressure and exhausting the diaphragms. Also, if desired, a separate reversible pumping system may be employed. Regardless of the system employed, the controls for selective operation of the system are, of course, arranged in the cockpit to be accessible to the pilot.

Another form of device embodying the invention is illustrated in FIGS. 15 and 16. This device is constructed in a manner similar to that described above but differs therefrom in that it employs a smooth base plate instead of the ridged base plate 43 and has an expansible diaphragm which is stretched or blown out in its inflated condition and on deflation returns to its initial position against the smooth surface. As shown in FIGS. 15 and 16, the diaphragm indicated at 61 is secured in position on the wing 14' over the smooth base plate (not visible) by a frame or shield member 62 similar to the shield 56 of the first embodiment. FIG. 15 shows the unit in its deflated condition and FIG. 16 in its inflated condition. The supply and exhauset of air or gas is effected through a supply conduit 63 essentially the same as the conduit 48 of the first modification, the air outlets below the diaphragm 61 being indicated at 64 in FIG. 15. The diaphragm 61 in its deflated condition thus conforms to a smooth surface and the top surface of the air supply conduit.

In the embodiment of the invention illustrated in FIGS. 17 and 18 a base plate 66 in the form of a smooth elongated panel is secured to the upper airfoil surface of the aircraft wing indicated at 14" and conforms to the upper surface; a partially expansible flexible sheet 67 is fitted over the panel 66 and is secured thereto by a shield frame or strap 68 which is attached to the wing of the plane together with the base panel 66 by means such as the screws 70. An air supply and withdrawal duct 71 similar to the conduits 48 and 63 described above is employed and is secured over the base plate 66 in communication with an air supply indicated at 52" which is connected in communication with an inboard selector valve indicated at 72 for alternatively connecting the conduit 71 to the pressure or exhaust conduits.

The sheet 67 is constructed of stretchable or expansible material such as a suitable rubber composition and is formed with portions of lesser thickness in the form of teardrops as indicated at 73. The varying thickness of the sheet is clearly shown in FIG. 18 which is a section through one of the portions 73. In order to limit the expanding movement of the sheet 67, a plurality of tension straps 74 of various lengths are secured to the plate 66 at one end and to the sheet 67 adjacent the edge of the expansible portion at their other ends; the locations of the ends of these straps are arranged to conform to the configuration of the teardrop portions 73. As illustrated the straps are arranged in a crossover pattern, each strap being secured to the plate 66 on one side of a portion 73 and to the sheet 67 at the other side thereof.

When the sheet 67 is expanded by admitting air under pressure to the space between the plate 66 and the sheet, the sheet moves to the configuration indicated in FIG. 17 and provides a series of teardrop bumps or domes similar to those of the preceding embodiments. When the air is exhausted the sheet 67 lies closely against the panel 66 and restores the aircraft wing to its original configuration.

Another embodiment similar to that of the embodiment of FIG. 17 is illustrated in FIGS. 19, 20 and 21. Here again a plurality of teardrop domes are provided, as indicated by the dotted line portions 76 in FIG. 19. The domes 76 are formed by providing teardrop shaped openings in the lower of two laminated sheets indicated at 77, the upper sheet as indicated at 78 covering the entire panel and providing the smooth outer surface of the wing. Air is admitted to the space between the airfoil and the expansible sheet through a duct 79 similar to the ducts employed in the other embodiments of the invention.

When air is admitted to the space below the panel, it expands outwardly and the portions of the sheet 78 covering the openings 76 in the sheet 77 expand upwardly and form the dome shaped configuration indicated in FIGS. 19 and 20. This embodiment thus provides an action similar to that of the embodiment of FIG. 17 and is readily constructed from two sheets of similar dimension, the lower sheet preferably being of material less stretchable than the upper sheet and acting as a retaining and configuration determining portion.

In both the embodiments of FIGS. 17 and 19 the elasticity of the material is such that the flexible sheets return to the configuration of the aircraft wing when they are deflated.

While the invention has been illustrated in connection with a conventional propeller driven aircraft and in specific modifications, various other arrangements and applications will occur to those skilled in the art. Therefore, it is not desired that the invention be limited to the specific details of construction illustrated and described and it is intended by the appended claims to cover all modifications which fall within the spirit and scope of the invention.

I claim:

1. In an aircraft including an airfoil surface of predetermined normal camber, an apparatus for altering the airfoil configuration to increase the camber thereof for securing greater lift at high angles of attack, said apparatus comprising an extensible device mounted on the airfoil in the zone of greatest departure of the curvature of the airfoil from the chord thereof, said device comprising an inflatable diaphragm of teardrop shape constructed to form when inflated an airfoil extension of smoothly curved dome-like teardrop configuration having its longitudinal axis in the direction of normal air flow over the airfoil surface, and shaping means for controlling the configuration of said diaphragm in its deflated condition to minimize drag during normal flight of the aircraft.

2. In an aircraft including an airfoil surface of predetermined normal camber, an apparatus for altering the airfoil configuration as set forth in claim 1 wherein said device includes means for retaining said diaphragm in a predetermined minimum drag configuration in its deflated condition and for limiting the diaphragm in its inflated condition to a predetermined maximum curvature.

3. In an aircraft including an airfoil surface of predetermined normal camber, an apparatus for altering the airfoil configuration as set forth in claim 1 wherein said shaping means comprises a base plate having smooth parallel alternate ridges and depressions for receiving said diaphragm in its deflated condition and for retaining it in a smooth configuration.

4. In an aircraft including an airfoil surface of predetermined normal camber, an apparatus for altering the airfoil configuration as set forth in claim 1 wherein said shaping means comprises a base plate having smooth alternate ridges and depressions extending substantially parallel to the direction of normal movement of air with respect to the airfoil, the dimensions and position of said ridges and depressions providing a seat for receiving said diaphragm in its deflated condition and for retaining it therein in a smooth configuration.

5. In an aircraft including an airfoil surface of predetermined normal camber, an apparatus for altering the airfoil configuration as set forth in claim 3 wherein said base plate is provided with a plurality of channels transverse to said ridges and said shaping means further including including tension members attached to said diaphragm and effective on deflation of said diaphragm to draw it into a position of engagement with said ridges.

6. In an aircraft including an airfoil surface of predetermined normal camber, an apparatus for altering the airfoil configuration as set forth in claim 5 wherein said tension members are of elastic material and are bonded to said diaphragm at points corresponding to the intersections of the depressions and the respective transverse channel.

7. In an aircraft including an airfoil surface of predetermined normal camber, an apparatus for altering the airfoil configuration to increase the camber thereof for securing greater lift at high angles of attack, said apparatus comprising a plurality of inflatable teardrop shaped diaphragm devices mounted along the airfoil in the zone of greatest departure of the curvature of the airfoil from the chord thereof, said diaphragm devices when inflated forming extensions of teardrop configuration and of smoothly curved external surface, and shaping means arranged to cooperate with each of said diaphragms for controlling the configuration thereof in its deflated condition to minimize drag during normal flight of the aircraft.

8. In an aicrcraft including an airfoil surface of predetermined normal camber, an apparatus for altering the airfoil configuration as set forth in claim 7 wherein said airfoil surface comprises the main wings of the aircraft and wherein said inflatable diaphragm devices are arranged along the main wings of the aircraft in series of decreasing size from the center of the aircraft toward the wing tip.

9. In an aircraft including an airfoil surface of predetermined normal camber, an apparatus for altering the airfoil configuration as set forth in claim 7 including common means for supplying and withdrawing gas from said inflatable devices to control the inflation and deflation thereof.

References Cited in the file of this patent

UNITED STATES PATENTS

| | | |
|---|---|---|
| 1,499,064 | Kuipers | June 24, 1924 |
| 1,803,915 | Parmele | May 5, 1931 |
| 2,711,868 | Parker | June 28, 1955 |
| 2,932,470 | Edkins | Apr. 12, 1960 |

FOREIGN PATENTS

| | | |
|---|---|---|
| 330,435 | Germany | Dec. 15, 1920 |